United States Patent
Wulff et al.

(10) Patent No.: US 7,288,127 B1
(45) Date of Patent: Oct. 30, 2007

(54) DUAL FUEL COMPOSITION INCLUDING ACETYLENE

(75) Inventors: Joseph W. Wulff, Hallsville; Maynard Hulett; Sunggyu Lee, both of Columbia, all of MO (US)

(73) Assignee: Go-Tec, Columbia, MO (US)

( * ) Notice: Subject to any disclaimer, the term of this patent is extended or adjusted under 35 U.S.C. 154(b) by 0 days.

(21) Appl. No.: 09/532,118

(22) Filed: Mar. 21, 2000

Related U.S. Application Data

(63) Continuation-in-part of application No. 09/257,340, filed on Feb. 25, 1999, now Pat. No. 6,076,487.

(51) Int. Cl.
*C10L 1/18* (2006.01)

(52) U.S. Cl. .............................. 44/401; 44/448; 44/451
(58) Field of Classification Search ................. 123/1 A, 123/446, 575; 44/401, 448, 451
See application file for complete search history.

(56) References Cited

U.S. PATENT DOCUMENTS

| | | | |
|---|---|---|---|
| 2,925,385 A | 2/1960 | Winnacker | |
| 3,982,391 A | 9/1976 | Reynolds | 60/39.02 |
| 4,054,423 A | 10/1977 | Blenman | 48/2 |
| 4,279,619 A | 7/1981 | Kunihiko et al. | 44/56 |
| 4,333,739 A * | 6/1982 | Neves | 44/401 |
| 4,398,921 A | 8/1983 | Rifkins et al. | 44/56 |
| 4,444,159 A | 4/1984 | Earl | 123/3 |
| 4,603,662 A | 8/1986 | Norton | 123/1 A |
| 4,647,288 A * | 3/1987 | Dillon | 44/401 |
| 4,757,787 A | 7/1988 | Risitano | 123/25 |
| 4,884,533 A | 12/1989 | Risitano | 123/25 |
| 4,945,863 A | 8/1990 | Schmitz et al. | 123/1 A |
| 6,076,487 A * | 6/2000 | Wulff et al. | 44/401 |
| 6,287,351 B1 * | 9/2001 | Wulff et al. | 44/404 |

FOREIGN PATENT DOCUMENTS

| | | | |
|---|---|---|---|
| DE | 2455910 | * | 5/1975 |
| FR | 132 362 C | | 4/1902 |
| FR | 559 303 A | | 9/1923 |
| FR | 649 213 A | | 12/1928 |
| FR | 866474 A | | 8/1941 |
| FR | 868 777 A | | 1/1942 |
| FR | 470 235 A | | 1/1947 |
| FR | 2542006 | * | 9/1984 |
| JP | 06313178 | * | 11/1994 |
| NL | 7415430 | * | 5/1974 |

OTHER PUBLICATIONS

J.W. Rose, and J.R. Cooper. *Technical Data On Fuels*. Seventh Edition. Halsted Press Book. New York: John Wiley & Sons, 1977. Pg. various tables throughout.

Kenneth Wark, Cecil F. Warner, and Wayne T. Davis. *Air Pollution Its Origin and Control*. Third Edition. Addison-Wesley. p. 517–525.

* cited by examiner

*Primary Examiner*—Jacqueline V. Howard
(74) *Attorney, Agent, or Firm*—Lathrop & Gage LC

(57) ABSTRACT

An environmentally clean dual fuel for use in an internal combustion engine, comprising acetylene as a primary fuel and a combustible fuel, such as one or more fluids selected from an alcohol such as ethanol, methanol or any other alcohol or alcohols from the group comprising $C_1$–$C_{20}$ carbon chains, ethers such as from the group comprising dimethyl ether, diethyl ether, methyl t-butyl ether, ethyl t-butyl ether, t-amyl methyl ether, di-isopropyl ether and the like, low-molecular-weight esters such as from the group comprising methyl formate, methyl acetate, ethyl acetate, methyl propionate, ethyl propionate, ethyl malate, and butyl malate, and the like, or other suitable combustible fluid such as mineral spirits and the like, as a secondary fuel for operatively preventing early ignition and knock arising from the primary fuel.

6 Claims, 1 Drawing Sheet

DUAL FUEL COMPOSITION INCLUDING ACETYLENE

This patent application is a continuation in part of U.S. patent application Ser. No. 09/257,340 filed Feb. 2, 1996, now U.S. Pat. No. 6,076,487.

BACKGROUND OF THE INVENTION

1. Field of the Invention

The present invention relates to a system using fuel comprising at least two combustible ingredients and more particularly, without limitation, to an internal combustion engine using fuel comprising acetylene and another combustible fuel.

2. Description of the Related Art

Acetylene is conventionally produced by reacting calcium carbide with water. The reaction is spontaneously occurring and can be conducted without any sophisticated equipment or apparatus. Such produced acetylene has been utilized for lighting in mine areas, by street vendors, etc. People often call such lighting sources "carbide lights" or "carbide lamps". Industrial uses of acetylene as a fuel for motors or lighting sources, however, has been nearly nonexistent. In modern times, the use of acetylene as a fuel has been largely limited to acetylene torches for welding or welding-related applications. In most such applications, acetylene is generally handled in solution form, such as acetylene dissolved in acetone for example.

The clean burning nature of acetylene is self-evident from the stoichiometric equation:

$$C_2H_2 + 2.5O_2 \rightarrow 2CO_2 + H_2O$$

The reaction proceeds spontaneously at any temperature and pressure conditions and easily goes to completion without leaving any residues other than the desired combustion products, namely carbon dioxide and water. Further, the reaction ideally takes place in a gaseous phase without any need for catalytic assistance. The gas-phase reaction has several advantages over heterogeneous reactions such as gas-liquid, gas-solid, and solid-liquid reactions. For example, the gas-phase reaction does not require much effort for mixing necessary ingredients, assuring proper ratios, or handling by-products of combustion. Such advantages become very significant in fuel applications for combustion engines where liquid fuels such as gasoline have been conventionally used, and gasoline (liquid-phase) and air (gas-phase) interact contact in an engine for combustion reaction purposes.

Gas-phase reaction, however, involves different measures, controls, and safety precautions. If acetylene is used either in pure form or in concentrated form, there is a strong tendency for detonation, which directly contributes to the difficulty in preventing undesirable spontaneous chemical reaction.

Combustion reactions occurring at relatively low temperature conditions could provide several advantages, including the following:

1) Atmospheric nitrogen requires a relatively high temperature (T>1200° C.) to react with atmospheric oxygen in order to form nitrogen oxides ($NO_x$) to any significant amount, the family of nitrogen oxides generally including $N_2O$, $NO$, $N_2O_3$, $NO_2$ and $N_2O_5$. Even at lower temperatures (T≅900° C.), small amounts of nitrogen oxides can be formed but only over extended periods of time. However, at such low temperatures, formation of $NO_x$ from reactions between nitrogen and oxygen are negligible or non-existent.

2) Low engine temperature alleviates any need for special emission control equipment commonly used in motor vehicles, such as an emission gas recirculation ("EGR") valve for example. One of the primary functions of an EGR system in modern motor vehicles is to reduce the combustion temperature by recirculating a portion of exhaust gas into the intake manifold, thus achieving a reduction in $NO_x$ formation in the combustion chamber. Such a requirement is not needed in an engine operating under relatively low temperate conditions.

3) Low engine temperatures significantly reduce any substantial requirement for motor cooling. Cooling for an engine operating under relatively low temperature conditions can be readily accomplished either by air-cooling or by water cooling (including with ethylene glycol-water mixtures, propylene glycol-water mixtures, and the like), but with less stringent capacities than with engines operating at relatively high temperatures.

4) Low motor temperature and clean burning help and boost the fuel efficiency, since the combustion energy generated goes far less toward the maintenance of the engine temperature. In other words, the power produced per BTU generated by the fuel is greater in the case of acetylene than for other conventional fuels under the circumstances.

5) Low temperature combustion permits simpler and cheaper exhaust system design, such as shorter length for example, particularly when the combustion products consist only of carbon dioxide and water. In addition, the hardware for such an exhaust system could be physically smaller in size.

Unfortunately, acetylene as a single fuel cannot be burned in an IC engine without severe knock and early ignition in the intake port, and in the cylinder, causing engine stopping and damage. For example, the results obtained from a computer model used to estimate the performance of a spark ignition engine when acetylene was used as a fuel was reported in "Computational Estimation of the Performance of a S. I. Engine with Various Fuels," *Nippon Kikai Gakkai Ronbunshu., B Hen.*, v. 56, n. 523, Mar. 190, pp. 830–835, by Katsumi Kataoka. Those calculations disclosed that when acetylene is used as a fuel, the flame temperatures rise high enough to cause the deterioration of the efficiency because of thermal dissociation, resulting in fairly high emissions of NO, especially with lean mixtures. In other words, these results appear to teach away from the use of acetylene as a fuel.

In another study reported in "Acetylene and Water as Fuels for Spark Ignition," *Proceedings of the Intersociety Energy Conversion Engineering Conference*, published by IEEE, IEEE Service Center, Piscataway, New Jersey, v. 4, pp. 61–66, by F. Bassi et al., acetylene was utilized as a laboratory surrogate in order to test water injection as a means to control spark ignited combustion of highly detonating fuels. The acetylene-water mixture was sprayed directly into the manifold with a high pressure positive displacement pump. The results indicated that overall efficiencies were higher with acetylene-water fueling than with gasoline. In addition, injected water caused a sharp reduction of $NO_x$ emissions below that obtainable by means of exhaust gas recirculation ("EGR").

Unfortunately, since water is not a combustible compound and is devoid of any BTU value for combustion purposes, injection of water into the combustion chamber decreases the effective volume available for gas expansion in the combustion chamber of the engine, thereby decreasing the horsepower output of the engine.

Thus, what is needed in a system for effectively and controllably utilizing acetylene, either as a mixture or concurrently with an alcohol or other combustible fluid, as a clean fuel for internal combustion engines wherein the combustible fluid can be used in conjunction with acetylene as an anti-knock and early ignition-preventing agent without reducing horsepower output arising from depletion of effective volume available for gas expansion due to the presence of a non-combustible fluid, such as water.

SUMMARY OF THE INVENTION

The improvement comprises a dual fuel for an internal combustion system having a primary fuel and a secondary fuel. The primary fuel generally comprises pure acetylene or a mixture of acetylene and one or more fluids selected from an alcohol such as ethanol, methanol or any other alcohol or alcohols from the group comprising $C_1$, $C_2$, . . . , $C_{19}$ and $C_{20}$ chains, preferably $C_1$–$C_{12}$ chains, ethers such as from the group comprising dimethyl ether, diethyl ether, methyl t-butyl ether, ethyl t-butyl ether, t-amyl methyl ether, di-isopropyl ether and the like, low-molecular-weight esters such as from the group comprising methyl formate, methyl acetate, ethyl acetate, methyl propionate, ethyl propionate, ethyl malate, butyl malate, and the like, or other suitable combustible fluid such as mineral spirits and the like.

The secondary fuel, which generally comprises one or more fluids selected from an alcohol such as ethanol, methanol, isopropyl alcohol, or any other alcohol or alcohols from the group comprising $C_1$, $C_2$, . . ., $C_{19}$ and $C_{20}$ chains, preferably $C_1$–$C_{12}$ chains, ethers such as from the group comprising dimethyl ether, diethyl ether, methyl t-butyl ether, ethyl t-butyl ether, t-amyl methyl ether, di-isopropyl ether and the like, low-molecular-weight esters such as from the group comprising methyl formate, methyl acetate, ethyl acetate, methyl propionate, ethyl propionate, ethyl malate, butyl malate, and the like, or other suitable combustible fluid such as mineral spirits and the like, is selected to prevent early ignition and knock otherwise arising from the acetylene.

Start-up and operation of an internal combustion engine utilizing the dual fuel generally comprises two stages. The first stage involves starting the engine with the secondary fuel and, after a relatively short warm-up period; the second stage involves generating power output by the engine, largely arising from combustion of the primary fuel. Injection of the secondary fuel is continued, however, to realize the early ignition and knock prevention provided thereby.

The dual fuel is designed to substantially or entirely eliminate emissions comprising products of incomplete combustion and $NO_x$ without the need for noxious emission reduction devices generally used with internal combustion engines.

The improvement also includes a method and a header for utilizing the inventive fuel in an internal combustion system.

PRINCIPAL OBJECTS AND ADVANTAGES OF THE INVENTION

The principal objects and advantages of the present invention include: providing a fuel comprising acetylene as a primary fuel for an internal combustion engine; providing such a fuel including a secondary fuel for eliminating knock which might otherwise arise from the acetylene; providing such a fuel including a secondary fuel for cooling an intake port of the internal combustion engine; providing such a fuel including a secondary fuel consisting essentially of an alcohol or other oxygenated fuel; providing such a fuel wherein a secondary fuel component thereof is used to start-up the internal combustion engine prior to injection of a primary fuel component thereof; providing an internal combustion system having a header for utilizing such a fuel; providing such a header wherein a secondary fuel introduced into the internal combustion system such that early ignition of the primary fuel is prevented; providing such a header wherein a secondary fuel introduced into the internal combustion system such that knock arising from the primary fuel is eliminated; providing a method for utilizing such a fuel and internal combustion system; and generally providing such a fuel/system/method that is/are efficient in operation, reliable in performance, and particularly well adapted for the proposed usages thereof Other objects and advantages of the present invention will become apparent from the following description taken in conjunction with the accompanying drawing, which constitutes a part of this specification and wherein are set forth exemplary embodiments of the present invention to illustrate various objects and features thereof

DETAILED DESCRIPTION OF THE INVENTION

Figure 1:
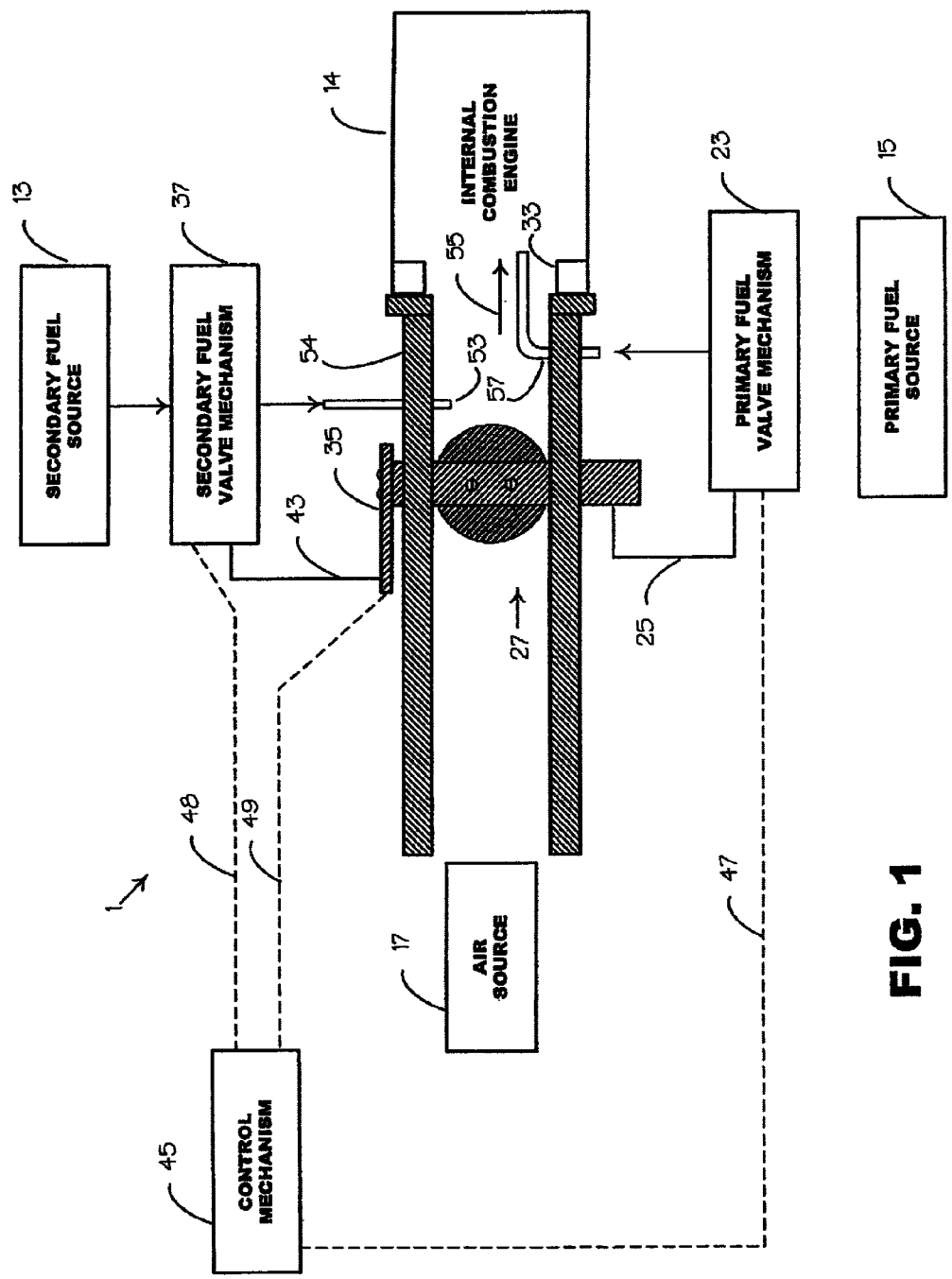
FIG. 1 is a schematic diagram of an internal combustion system designed for using an acetylene fuel in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a fuel utilizing acetylene in accordance with the present invention. The inventive process and internal combustion system utilizing the acetylene fuel is generally based on a two-stage ignition procedure to ensure safe ignition and avoidance of otherwise undesired premature combustion or detonation of the acetylene. The two-stage ignition is generally accomplished by a first step wherein a secondary fuel 13, which may sometimes be referred to herein as a first combustible fuel component or fluid 13, is utilized for ignition purposes to start-up an internal combustion engine 14. The first combustible fluid 13 is preferably selected to provide complete combustion without noxious emissions; for example, an alcohol such as ethanol, methanol, isopropyl alcohol, or any other alcohol or alcohols from the group comprising $C_1$, $C_2$, $C_{19}$ and $C_{20}$ chains, preferably $C_1$–$C_{12}$ chains, ethers such as from the group comprising dimethyl ether, diethyl ether, methyl t-butyl ether, ethyl t-butyl ether, t-amyl methyl ether, di-isopropyl ether and the like, low-molecular-weight esters such as from the group comprising methyl formate, methyl acetate, ethyl acetate, methyl propionate, ethyl propionate, ethyl malate, butyl malate, and the like, or other suitable combustible fluid such as mineral spirits and the like. It is to be understood that for some applications, however, the secondary fuel 13 may be a gasoline, a gasoline blend, or other suitable combustible fluid, including blends and mixtures thereof, that may or may not produce noxious emissions and still be within the spirit and nature of the present invention as hereinafter described.

After ignition during the first step, a second step involves delivering a primary fuel 15, which may sometimes be referred to herein as a second combustible fuel component or fluid 15, containing acetylene to the internal combustion engine 14. The primary fuel 15 may be pure acetylene, a mixture of acetylene and an alcohol such as ethanol, methanol, isopropyl alcohol, or any other alcohol or alcohols from the group comprising $C_1, C_2, \ldots, C_{19}$ and $C_{20}$ chains, preferably $C_1$–$C_{12}$ chains, ethers such as from the group comprising dimethyl ether, diethyl ether, methyl t-butyl ether, ethyl t-butyl ether, t-amyl methyl ether, di-isopropyl ether and the like, low-molecular-weight esters such as from the group comprising methyl formate, methyl acetate, ethyl acetate, methyl propionate, ethyl propionate, ethyl malate, butyl malate, and the like, or other suitable combustible fluid such as mineral spirits and the like, or other suitable mixture. The primary fuel 15 may be metered and directly injected into a combustion chamber of the internal combustion engine 14 whereat the primary fuel 15 is first exposed to air 17 as an oxygen-containing combustion-inducing environment, or delivered in any other appropriate manner, known to those skilled in the art.

Control of the ratio of air to the primary fuel 15 can be realized by a primary fuel valve mechanism 23, such as a preset valve 23, a throttling valve 23 permitting automatic adjustment, or other suitable arrangement. More specifically, the flow rate of primary fuel 15 may be regulated by connecting the primary fuel valve mechanism 23 by a linkage arrangement, schematically shown and indicated by the numeral 25 in FIG. 1, to a throttle valve mechanism 27, configured to operatively control the flow of air 17 to an intake port 33 of the internal combustion engine 14. The throttle valve mechanism 27, in turn, includes linkage, schematically shown by the element designated by the numeral 35, to provide speed control for the internal combustion engine 14. Similarly, control of the secondary fuel 13 can be realized by a secondary fuel mechanism 37, which may include a set adjustable jet spaced near the closure of the throttle valve mechanism 27, by a linkage arrangement schematically shown and indicated by the numeral 43, or other suitable arrangement.

Alternatively, a control system 45, such as a microprocessor arrangement for example, may be connected to the primary fuel valve mechanism 23, the secondary fuel valve mechanism 37, and the linkage 35, by connections schematically indicated by dashed lines designated by numerals 47, 48 and 49, to provide desired ratios of secondary fuel 13 and primary fuel 15 as needed for selected operating speeds of the internal combustion engine 14.

So long as the oxygen content of the input air 17 exceeds stoichiometric requirements to accomplish complete combustion of the combustible fluids involved, the process satisfactorily proceeds to completion. For example, the air-to-fuel ratio for applications wherein the primary fuel 15 comprises pure acetylene generally ranges between 11.9 and 15.0, preferably between 12.0 and 13.0. It is to be understood that if the composition of the primary fuel 15 differs from pure acetylene, the air-to-fuel ratio must be adjusted accordingly in order to ensure that the supply of oxygen provided by the air 17 is sufficient to meet or exceed the stoichiometric requirements for a complete combustion reaction.

Shutting down the operation of the internal combustion engine 14 is preferably accomplished by reversing the start-up procedure. That is, the flow of the primary fuel 15 to the engine 14 is terminated, followed by termination of the flow of the secondary fuel 13 to the engine 14.

In an application of the present invention, the secondary fuel valve mechanism 37 is adjusted to discharge a desired flow rate of the secondary fuel 13 through a secondary fuel port 53 into a manifold 54 to be operably swept by the air 17 through the intake port 33 into the internal combustion engine 14, as indicated by the arrow designated by the numeral 55. After the internal combustion engine 14 is started with the secondary fuel 13 and allowed to operate for a relatively short period of time, the primary fuel valve mechanism 23 is adjusted to discharge a desired flow rate of the primary fuel 15 through a primary fuel injection port 57 directly into a combustion chamber of the internal combustion engine 14, as schematically shown in the Figure. With the internal combustion engine 14 operating primarily on the primary fuel 15, the relative flow rate of the secondary fuel 13 may or may not be adjusted as desired; however, a flow rate of the secondary fuel 13 is maintained during operation of the internal combustion engine 14 on the primary fuel 15 in order to cool the manifold 54 and the intake port 33, and in order to control and prevent early ignition and knock of the primary fuel 15. For example, the ratio of alcohol to acetylene may be approximately ten percent for anti-knock and early ignition avoidance purposes. It is to be understood, however, that the percent of alcohol or other secondary fuel component as described herein in a particular application may need to be adjusted for different loads, air intake temperatures, etc.

The following example shows data from operation of an internal combustion engine 14 using acetylene as the primary fuel 15 in accordance with the present invention.

EXAMPLE

Tests were run using a single cylinder, overhead-valve internal combustion, Briggs & Stratton engine. The method of fuel introduction was by a dual fuel, constant flow, port type fuel injection arrangement, as schematically shown in FIG. 1. Pure acetylene, $C_2H_2$, was used as the primary fuel 15 and methyl alcohol, $CH_4O$, was used as the secondary fuel 13. The source for the acetylene 15 was a standard cylinder, as customarily used for welding purposes, with the primary fuel valve mechanism 23 comprising a standard pressure regulator. The regulator 23 was adjusted to provide the acetylene at fifteen p.s.i.g. A standard back-flow check valve was provided at the injection port 57.

The methyl alcohol 13, which has a gross energy producing capability of 10,259 BTU/lb., was injected into the engine manifold 54 at a relatively low rate that, upon introduction of the primary fuel 15, would avoid early ignition and knock thereof The rate at which the secondary fuel 13 was injected into the manifold 54 caused the engine to operate at a fast idle speed (approximately 800 r.p.m.). Such an injection rate of methyl alcohol 13 was found to be sufficient to prevent early ignition and knock arising from the primary fuel 15 regardless of the rate that the primary fuel 15 was supplied to the engine 14 and regardless of the resulting operating speed and load output of the engine 14. The test was conducted without any EGR or catalytic converter devices.

A brake-type dynamometer was used to determine the horsepower output of the engine 14. For load tests of longer duration, a water pump was driven by the engine 14 with the magnitude of the load being adjusted by restricting the outlet of the pump with a valve. Braking-horsepower measurements of the test engine 14 when operated on gasoline as the primary fuel as compared with those of the test engine when operated on the inventive dual fuel (acetylene as the primary fuel 15, methyl alcohol as the secondary fuel 13) provided the following results: 8 horsepower at 3600 r.p.m for gasoline, and 8 horsepower at 3500 r.p.m. for the dual fuel 13, 15.

Tests of emissions from the engine 14 when operated on the test dual fuel 13, 15, measured with a Bacharach Combustion Gas Analyzer Model CA300NSX, disclosed the following:

| Parameter | Test Strip #1 | Test Strip #2 | Test Strip #3 |
| --- | --- | --- | --- |
| Exhaust Temp., ° F. | 757 | 818 | 827 |
| $O_2$ (%) | 9.4 | 9.3 | 9.4 |
| $CO_2$ (%) | 8.6 | 8.7 | 8.6 |
| CO (%) | 0.055 | 0.051 | 0.052 |
| $NO_x$ (%) | not detectable | 0.002 | 0.002 |
| Com. Temp., ° F. | 1180 | 1220 | 1250 |
| Air Flow (dP) | 0.55 | 0.55 | 0.55 |
| Air Flow (ft./s.) | 74.99 | 76.84 | 77.11 |
| Air Flow (c.f.m.) | 167 | 171 | 171 |

The test results clearly indicate that the emission levels of all targeted species from the acetylene-operated internal combustion system, even without emission-control devices, were well below the governmentally established regulatory limits, showing such a system to be environmentally superior to prior art internal combustion systems.

Thus, the evaporative effect of the secondary fuel 13 provided adequate cooling to prevent early ignition and knock of the acetylene primary fuel 15 while producing horsepower output comparable to that obtainable from gasoline fuel yet attaining an extremely clean exhaust without the need for emission control arrangements.

The acetylene combustion process disclosed herein proceeds to completion over an extremely wide range of temperature and pressure conditions. In other words, the reaction does not require a high-temperature environment generally required in a combustion chamber of an internal combustion engine. Since acetylene does not contain sulfurous compounds, refining or upgrading of acetylene for fuel purposes in order to reduce sulfur or nitrogen compounds is unnecessary. In other words, the use of acetylene as a fuel ensures minimal or no emission of $NO_x$ or $SO_x$ originating from the acetylene. In addition, the operating temperature is sufficiently low enough such that very little or no $NO_x$ is generated from nitrogen in the atmosphere. As an additional benefit, an engine reliably and controllably operating on acetylene fuel, as taught herein, is far better suited for indoor use than its counterparts fueled by gasoline or gasoline/alcohol mixtures.

It is to be understood that the use of modern electronic port-type fuel injection arrangements and/or in conjunction with the present invention, such as the control mechanism 45 as hereinbefore described, can accurately provide selected rates from each of the primary fuel valve mechanism 23 and the secondary fuel valve mechanism 37 to alter mixture ratios relative to air intake and air intake temperature to thereby effectively provide a certain amount of control over cylinder head temperature, exhaust temperature, cooling system temperature, etc., and to thereby realize very efficient, clean-exhaust, internal combustion system applications by use of the inventive acetylene fuel system. It should now be obvious that the present invention is readily adaptable to both air-cooled engine applications and water-cooled engine applications, including, of course, engine applications utilizing various other coolants, such as ethylene glycol or the like.

It is to be understood that although the primary fuel 15 may be liquid or gas, the secondary fuel 13 may be liquid or gas so long as operating temperature environment of the secondary fuel 13 avoids early ignition and knock of the secondary fuel 13 while simultaneously providing sufficient cooling to also avoid early ignition and knock of the primary fuel 15.

Thus, benefits and advantages provided by the inventive clean-burning fuel 13, 15 for an internal combustion engine 14 taught herein include the following:

a) the need for a three-way catalytic converter or other EGR device is eliminated;

b) proper exhaust design requirements are substantially reduced;

c) due to reduced operating temperatures, there is less tendency for viscosity breakdown of engine lubricants and less component wear;

d) due to cleanliness of the combustion process, buildup of carbon- and sulfur compounds are eliminated thereby substantially extending the time intervals between routine maintenance requirements, such as tune-ups, oil changes, etc.;

e) an engine operated on such a fuel is substantially better suited for indoor operation than is an engine operated on other conventional fuels; and f) an engine operated on such a fuel can be interchangeably utilized for indoor and outdoor operations without environmental concerns.

Notwithstanding anything herein to the contrary, it is to be understood that the inventive fuel may also consist of a mixture comprising acetylene and at least one fluid selected from an alcohol such as ethanol, methanol, isopropyl alcohol, or any other alcohol or alcohols from the group comprising $C_1$, $C_2$, . . . , $C_{19}$ and $C_{20}$ chains, preferably $C_1$–$C_{12}$ chains; an ether such as from the group comprising dimethyl ether, diethyl ether, methyl t-butyl ether, ethyl t-butyl ether, t-amyl methyl ether, di-isopropyl ether and the like; a low-molecular-weight ester such as from the group comprising methyl formate, methyl acetate, ethyl acetate, methyl propionate, ethyl propionate, ethyl malate, butyl malate, and the like, and/or another suitable combustible fluid such as mineral spirits and the like, wherein startup and operation of an internal combustion engine consists essentially of a single step—as opposed to a dual fuel, two-step arrangement—while realizing the early ignition avoidance and anti-knock characteristics hereinbefore described.

It is to be understood that while certain forms of the present invention have been illustrated and described herein, it is not to be limited to the specific forms or arrangement of parts described and shown.

What is claimed and desired to be secured by Letters Patent is as follows:

1. A fuel for introduction into a combustion chamber of an internal combustion system, consisting essentially of a mixture of acetylene and at least one fluid selected from the group consisting of an aliphatic alcohol having 1 to 20 carbon atoms, an aliphatic ether having 2 to 6 carbon atoms, an aliphatic ester having 2 to 12 carbon atoms, and combinations thereof, said at least one fluid being approximately 10 percent of said fuel.

2. A fuel for an internal combustion system, comprising a mixture of acetylene and at least one fluid selected from the group consisting of an aliphatic alcohol having 1 to 20 carbon atoms, an aliphatic ether having 2 to 6 carbon atoms, an aliphatic ester having 2 to 12 carbon atoms, and combinations thereof, said at least one fluid being approximately 10 percent of fuel.

3. The fuel according to claim 2, wherein said alcohol comprises at least one of methanol, ethanol, and isopropyl alcohol.

4. The fuel according to claim 2, wherein said alcohol includes a compound of the following formula:

ROH wherein R is selected from the group consisting of $C_1$–$C_{12}$ carbon chains.

5. The fuel according to claim 2, wherein said ether comprises at least one of dimethyl ether, diethyl ether, methyl t-butyl ether, ethyl t-butyl ether, t-amyl methyl ether, and di-isopropyl ether.

6. The fuel according to claim 2, wherein said ester comprises at least one of methyl formate, methyl acetate, ethyl acetate, methyl propionate, ethyl propionate, ethyl malate, and butyl malate.

* * * * *